(12) United States Patent
Fujiwara

(10) Patent No.: US 8,331,000 B2
(45) Date of Patent: Dec. 11, 2012

(54) IMAGE FORMING APPARATUS

(75) Inventor: Michiko Fujiwara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 700 days.

(21) Appl. No.: 12/456,533

(22) Filed: Jun. 18, 2009

(65) Prior Publication Data

US 2009/0323136 A1  Dec. 31, 2009

(30) Foreign Application Priority Data

Jun. 25, 2008 (JP) ................................. 2008-166620

(51) Int. Cl.
- *H04N 1/04* (2006.01)
- *H04N 1/40* (2006.01)
- *H04N 1/387* (2006.01)
- *H04N 1/393* (2006.01)

(52) U.S. Cl. ........ 358/488; 358/486; 358/497; 358/474; 358/449; 358/451; 358/452; 358/296

(58) Field of Classification Search ................ None
See application file for complete search history.

(56) References Cited

U.S. PATENT DOCUMENTS

| | | | |
|---|---|---|---|
| 5,717,941 | A | 2/1998 | Yoshida et al. |
| 6,690,482 | B1 * | 2/2004 | Toyoda et al. ............. 358/1.2 |
| 2002/0003981 | A1 | 1/2002 | Fukushima |
| 2009/0161145 | A1 * | 6/2009 | Regenmorter et al. ...... 358/1.15 |
| 2009/0168124 | A1 * | 7/2009 | Edwards et al. ............. 358/488 |

FOREIGN PATENT DOCUMENTS

| | | |
|---|---|---|
| JP | 59-023335 A | 2/1984 |
| JP | 61-203437 A | 9/1986 |
| JP | 05-199380 | 8/1993 |
| JP | 7-306927 A | 11/1995 |
| JP | 10-215369 A | 8/1998 |
| JP | 11-205584 A | 7/1999 |
| JP | 2001-002260 A | 1/2001 |
| JP | 2001-339550 A | 12/2001 |
| JP | 2002-094773 | 3/2002 |
| JP | 2006-094392 | 4/2006 |
| JP | 2006-339770 A | 12/2006 |
| JP | 2007-116611 A | 5/2007 |
| JP | 2008-072640 A | 3/2008 |

* cited by examiner

*Primary Examiner* — Cheukfan Lee
(74) *Attorney, Agent, or Firm* — Edwards Wildman Palmer LLP; George W. Neuner

(57) ABSTRACT

An image forming apparatus is provided that is capable of accurately outputting images of both sides of a card type document to the same side of a sheet of paper with a simple operation. On a card size input screen, a first scale for measuring a long-side size of a card type document and a second scale for measuring a short-side size of the card type document are displayed on a same screen such that they intersect at an origin. By operating a long-side size-decreasing instruction portion and a long-side size-increasing instruction portion, the long-side size of the card type document is decreased or increased and inputted. By operating a short-side size-decreasing instruction portion and a short-side size-increasing instruction portion, the short-side size of the card type document is decreased or increased and inputted.

8 Claims, 14 Drawing Sheets

FIG. 13 PRIOR ART
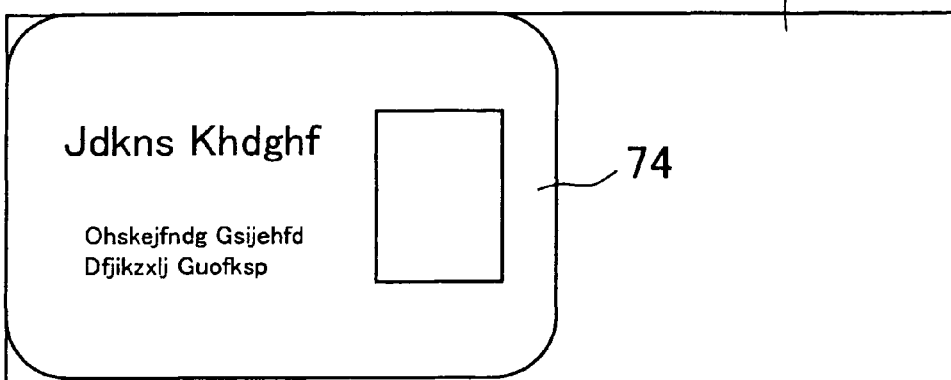
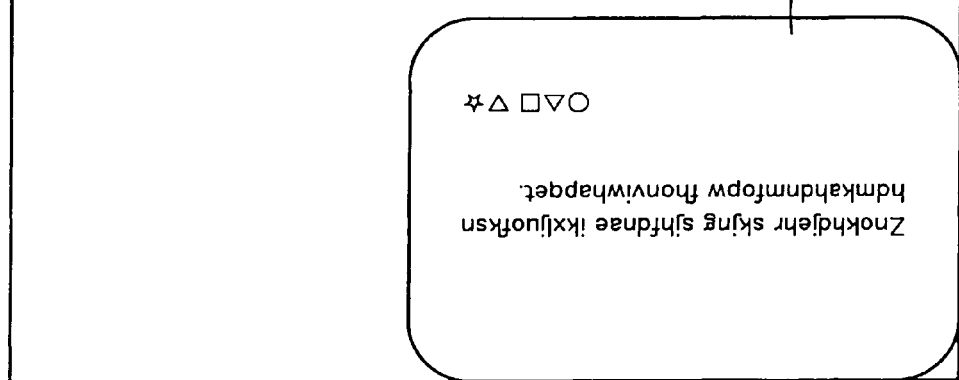

ively and
speedily.

IMAGE FORMING APPARATUS

CROSS-REFERENCE TO RELATED APPLICATION

This application claims priority to Japanese Patent Application No. 2008-166620, which was filed on Jun. 25, 2008, the contents of which are incorporated herein by reference in its entirety.

BACKGROUND OF THE INVENTION

1. Field of the Invention

The present invention relates to an image forming apparatus that prints images of both a front side and a back side of a card type document on the same side of a recording medium.

2. Description of the Related Art

Conventionally, when a copier is used to copy, onto the same side of a sheet of paper, two images that have been printed on the front side and the back side of a small card-like document (hereinafter called a "card type document") such as a business card, there is commonly performed a method where, once an image of the front side of the card type document is copied onto the same side of the sheet of paper, the sheet of paper on which an image of the front side of the card type document has been printed is reversed and an image of the back side of the card type document is copied on the same side of the sheet of paper. However, with this method, it is easy for mistakes to occur where, as shown in FIG. 12, an image 71 of the front side of the card type document and an image 72 of the back side of the card type document are copied such that they overlap each other in a copy image 70 or where, as shown in FIG. 13, an image 74 of the front side of the card type document and an image 75 of the back side of the card type document are printed such that they are oppositely oriented in a copy image 73, and there is a problem that, in order to print the two images borne on the front side and the back side of the card type document in desired positions, it is necessary to accurately place the card type document on the document platen, and this operation is troublesome.

As a technology that remedies the problem of copying a card type document, for example, the image forming apparatus described in Japanese Unexamined Patent Publication JP-A 2002-94773 includes a so-called two-in-one layout function which, when a document image arrangement pattern is selected from plural patterns, causes plural images to be printed on one sheet of paper based on the selected pattern. Thus, the two images borne on the front side and the back side can be printed on the same side of the sheet of paper without the image of the front side and the image of the back side being printed such that they overlap each other or such that they are oppositely oriented.

When this layout function is used to print an image of the front side and an image of the back side of a card type document on the same side of a sheet of paper, the document images are reduced to about 70%, so when the sizes of the print images are to be made into the same sizes as the document images, it is necessary to enlarge the sizes of the print images to about 141%.

However, there is the problem that, as shown in FIG. 14, depending on the position where the card type document is placed on the document platen, when the document images are enlarged and printed, the enlarged images do not fit on the sheet of paper, and part of an image 77 of the front side of the card and part of an image 78 of the back side of the card go missing as in a copy image 76. Further, there is a problem that it is difficult to align the positions of the enlarged images in consideration of reduction even if the images do not go missing, and this operation cannot be performed accurately and speedily.

In order to consider enlargement and reduction, for example, it is necessary to measure the actual dimensions of the card type document with a ruler or the like, calculate the dimensions of the enlarged or reduced images based on the measurement results, and determine the layout and the like from the size of the sheet of paper and the calculated dimensions of the images, and this operation of course ends up becoming complicated.

SUMMARY OF THE INVENTION

It is an object of the invention to provide an image forming apparatus that is capable of accurately outputting images of both sides of a card type document to the same side of a sheet of paper with a simple operation.

The invention provides an image forming apparatus that reads images of both a front side and a back side of a card type document and prints the two document images that the image forming apparatus has read onto a same side of a recording medium, the image forming apparatus comprising:

a measurement instrument display unit that displays a measurement instrument that measures the dimensions of the card type document;

a dimension input unit that inputs the dimensions of the card type document; and a setting unit that sets arrangement positions of the two document images on the same side of the recording medium based on the dimensions that have been inputted by the dimension input unit.

According to the invention, the measurement instrument that measures the dimensions of the card type document is displayed by the measurement instrument display unit, so the dimensions of the card type document can be measured by the displayed measurement instrument, and the dimensions of the card type document can be inputted by the dimension input unit. The setting unit sets arrangement positions of the two document images on the same side of the recording medium based on the dimensions that have been inputted by the dimension input unit.

Thus, images of both sides of the card type document can be accurately outputted to the same side of a sheet of paper by a simple operation.

Further, in the invention, it is preferable that the measurement instrument display unit displays a first measurement instrument that measures the dimension of a long side of the card type document and a second measurement instrument that measures the dimension of a short side of the card type document, and the dimension input unit includes a first dimension input unit that inputs the dimension of the long side of the card type document and a second dimension input unit that inputs the dimension of the short side of the card type document.

According to the invention, the measurement instrument display unit displays the first measurement instrument that measures the dimension of the long side of the card type document and the second measurement instrument that measures the dimension of the short side of the card type document, and the dimension input unit includes the first dimension input unit that inputs the dimension of the long side of the card type document and the second dimension input unit that inputs the dimension of the short side of the card type document.

Thus, the dimension of the long side and the dimension of the short side can be measured individually at the same time, and the dimensions can be inputted individually, so a situation where a user mistakenly inputs the (vertical and horizontal) dimensions of the long side and the short side can be prevented, and a situation where part of an image goes missing in a copy image can be prevented.

Further, in the invention, it is preferable that the measurement instrument display unit displays the first measurement instrument and the second measurement instrument on the same screen such that an extension direction of the first measurement instrument and an extension direction of the second measurement instrument intersect.

According to the invention, the measurement instrument display unit displays the first measurement instrument and the second measurement instrument on the same screen such that the extension direction of the first measurement instrument and the extension direction of the second measurement instrument intersect.

Thus, by applying the card type document to the displayed measurement instruments, the dimension of the long side and the dimension of the short side can be measured at the same time, so measurement of the dimensions can be done accurately and rapidly.

Further, in the invention, it is preferable that the measurement instrument display unit displays, in accordance with the dimensions that have been inputted by the dimension input unit, dimension confirmation lines that intersect the extension directions of the measurement instruments at those places of the measurement instruments.

According to the invention, the measurement instrument display unit displays, in accordance with the dimensions that have been inputted by the dimension input unit, the dimension confirmation lines that intersect the extension directions of the measurement instruments at those places of the measurement instruments.

The card type document can be directly compared with the document dimensions represented by the dimension confirmation lines, so the user can easily confirm whether the dimensions that have been inputted are wrong or not, and dimension input mistakes can be prevented.

Further, in the invention, it is preferable that the measurement instrument display unit switches between the metric unit and non-metric unit (e.g., inch) and displays the display unit of the measurement instrument.

According to the invention, the measurement instrument display unit switches between the metric unit and non-metric unit (e.g., inch) and displays the display unit of the measurement instrument.

Thus, a situation where the user ends up inputting a dimension in the wrong unit can be prevented.

Further, in the invention, it is preferable that the image forming apparatus further comprises a scale factor input unit that inputs the scale factor when printing the document images that the image forming apparatus has read, wherein the setting unit sets arrangement positions of the two document images on the same side of the recording medium based on the dimensions that have been inputted by the dimension input unit and the scale factor that has been inputted by the scale factor input unit.

According to the invention, the scale factor input unit inputs the scale factor when printing the document images that the image forming apparatus has read. The setting unit sets arrangement positions of the two document images on the same side of the recording medium based on the dimensions that have been inputted by the dimension input unit and the scale factor that has been inputted by the scale factor input unit.

Thereby, the copy image can be changed to a size that is easy to see and can be printed.

Further, in the invention, it is preferable that the image forming apparatus further comprises a rotation angle input unit that inputs the rotation angle when printing the document images that the image forming apparatus has read, wherein the setting unit sets arrangement positions of the two document images on the same side of the recording medium based on the dimensions that have been inputted by the dimension input unit and the rotation angle that has been inputted by the rotation angle input unit.

According to the invention, the rotation angle input unit inputs the rotation angle when printing the document images that the image forming apparatus has read. The setting unit sets arrangement positions of the two document images on the same side of the recording medium based on the dimensions that have been inputted by the dimension input unit and the rotation angle that has been inputted by the rotation angle input unit.

Thereby, the copy image can be rotated to an orientation that is easy to see and can be printed.

Further, the invention provides an image forming method that reads images of both a front side and a back side of a card type document and prints the two document images that the image forming method has read onto a same side of a recording medium, the image forming method comprising the steps of:

displaying a measurement instrument that measures the dimensions of the card type document;

inputting the dimensions of the card type document; and setting arrangement positions of the two document images on the same side of the recording medium based on the dimensions that have been inputted.

According to the invention, the measurement instrument that measures the dimensions of the card type document is displayed, so the dimensions of the card type document can be measured by the displayed measurement instrument, and the dimensions of the card type document can be inputted. The arrangement positions of the two document images on the same side of the recording medium are set based on the dimensions that have been inputted.

Thus, images of both sides of the card type document can be accurately outputted to the same side of a sheet of paper by a simple operation.

BRIEF DESCRIPTION OF DRAWINGS

Other and further objects, features, and advantages of the invention will be more explicit from the following detailed description taken with reference to the drawings wherein:

FIG. 13 is a diagram showing a failed copy image; and

DETAILED DESCRIPTION

Figure 1:
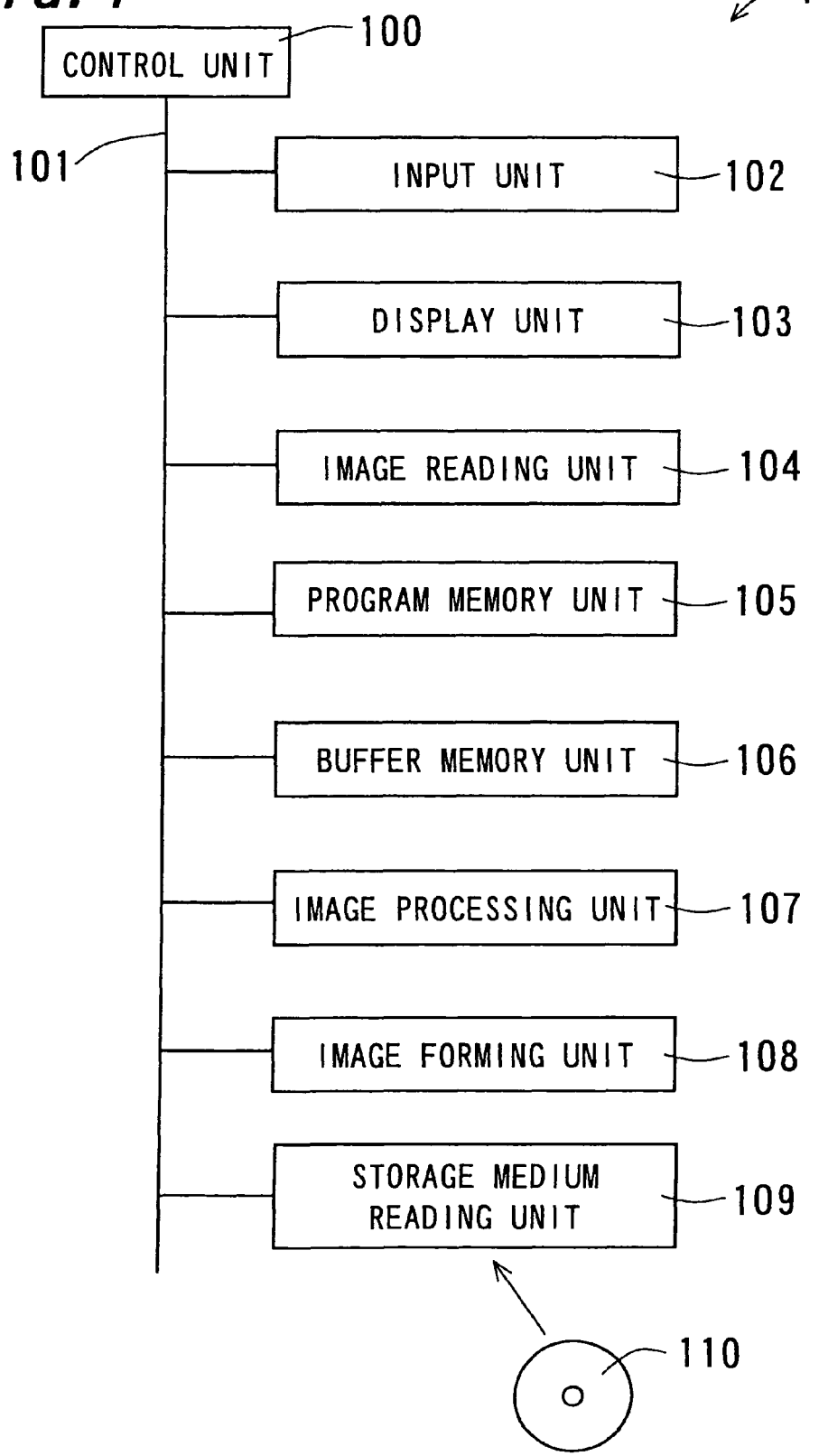
FIG. 1 is a block diagram showing the configuration of an image forming apparatus according to one embodiment of the invention.

Now referring to the drawings, preferred embodiments of the invention are described below.

FIG. 1 is a block diagram showing the configuration of an image forming apparatus 1 according to one embodiment of the invention. The image forming apparatus 1 according to the present embodiment includes a control unit 100, a bus line 101, an input unit 102, a display unit 103, an image reading unit 104, a program memory unit 105, a buffer memory unit 106, an image processing unit 107, an image forming unit 108 and a storage medium reading unit 109.

The control unit 100 is constructed of a central processing unit (CPU), for example, and realizes an image forming method of the invention by reading a control program from the program memory unit 105 and controlling each unit via the bus line 101 that transfers various data such as address data, control data and image data.

The input unit 102 is constructed of hardware keys and a touch panel overlaid on a liquid crystal display, for example, and can input copy instructions, input sizes of card type documents, set scale factors and set angles of rotation. That is, the input unit 102 functions as an element unit that receives input of sizes of long sides and short sides of card type documents, an element unit that receives setting of scale factors with respect to print images of card type documents, and an element unit that receives setting of angles of rotation of images of card type documents.

The display unit 103 is constructed of a liquid crystal display (LCD), a cathode ray tube (CRT) display or a plasma display (PD), for example, and displays scales for measuring the sizes of card type documents, numerical values of sizes that have been inputted from the input unit 102, size confirmation lines, scale factors, rotation angles and paper sizes.

Input of the size of a card type document, for example, is performed by displaying scales on a liquid crystal display that is the display unit 103, using the displayed scale to measure the size (the length of a long side and the length of a short side) of a card type document that is to be printed, and using the touch panel (the input unit 102) on the liquid crystal display to input the size of the card type document.

The image reading unit 104 comprises an image reading program, a scanner unit including a CCD image sensor and a document platen and reads images as digital data from various documents including card type documents that have been placed in a predetermined position on the document platen. The image data that have been read are stored in the buffer memory unit 106.

The program memory unit 105 is constructed of a read-only memory (ROM), an electrically erasable and programmable read-only memory (EEPROM), a hard disk or a magneto-optical (MO) disk, for example, and stores a main routine control program for the control unit 100 to control each unit, an image forming program for forming images, a storage control program for associating document images that have been read by the image reading unit 104 with addresses and storing them in the buffer memory unit 106, and a bus control program for controlling the bus line 101.

The buffer memory unit 106 is constructed of a random access memory (RAM), an EEPROM, a flexible disk, a hard disk or an MO disk, for example, and stores in-control data that are controlled by the control unit 100, instruction information that has been inputted and image forming conditions. Further, the buffer memory unit 106 functions as an image storing unit that temporarily stores images of card type documents that have been read.

The image processing unit 107 is constructed of an application specific integrated circuit (ASIC) or the like that operates based on an image processing program, reads image data of documents including card type documents from the buffer memory unit 106 on a bit map, scales the image data of the documents by scale factors that have been set by the input unit 102, rotates the image data of the documents by angles of rotation that have been set by the input unit 102, and performs, in accordance with the size of a card type document that has been inputted by the input unit 102, image combination processing such that an image of the front side of the card type document and an image of the back side of the card type document are arranged in predetermined positions on the same side of a sheet of recording paper.

Further, the image processing unit 107 performs various processing such that the image forming unit 108 can print, with high reproducibility, image data that have been inputted, such as shading correction, segmentation processing, input tone correction, color correction, black generation and under color removal, spatial filter processing and halftone processing.

The image forming unit 108 is an electrophotographic image forming unit that is constructed of a photoconductor drum, a laser scanning unit, a charging unit, a developing unit and a transfer charger, for example, and operates based on an image forming program, and the image forming unit 108 reproduces and records document images on the front side of a recording medium such as copy paper.

The storage medium reading unit 109 includes a reading device for reading various data and computer programs that are stored in a storage medium 110. The storage medium 110 represents a storage medium that fixedly carries a program and is constructed of a semiconductor memory including a mask ROM, an EPROM, an EEPROM or a flash ROM or media separable from a body including disks like a magnetic disk such as a hard disk or an optical disc such as a CD-ROM, an MO disk, an MD or a DVD and cards such as an IC card (including a memory card) or an optical card.

As the computer programs that are stored in the storage medium 110, a computer program according to the invention is included in addition to the image processing program, the main routine control program, the image forming program, the storage control program and the bus control program mentioned above. These computer programs that have been read by the storage medium reading unit 109 are stored in the program memory unit 105 as one of control programs that the control unit 100 executes.

Figure 2:
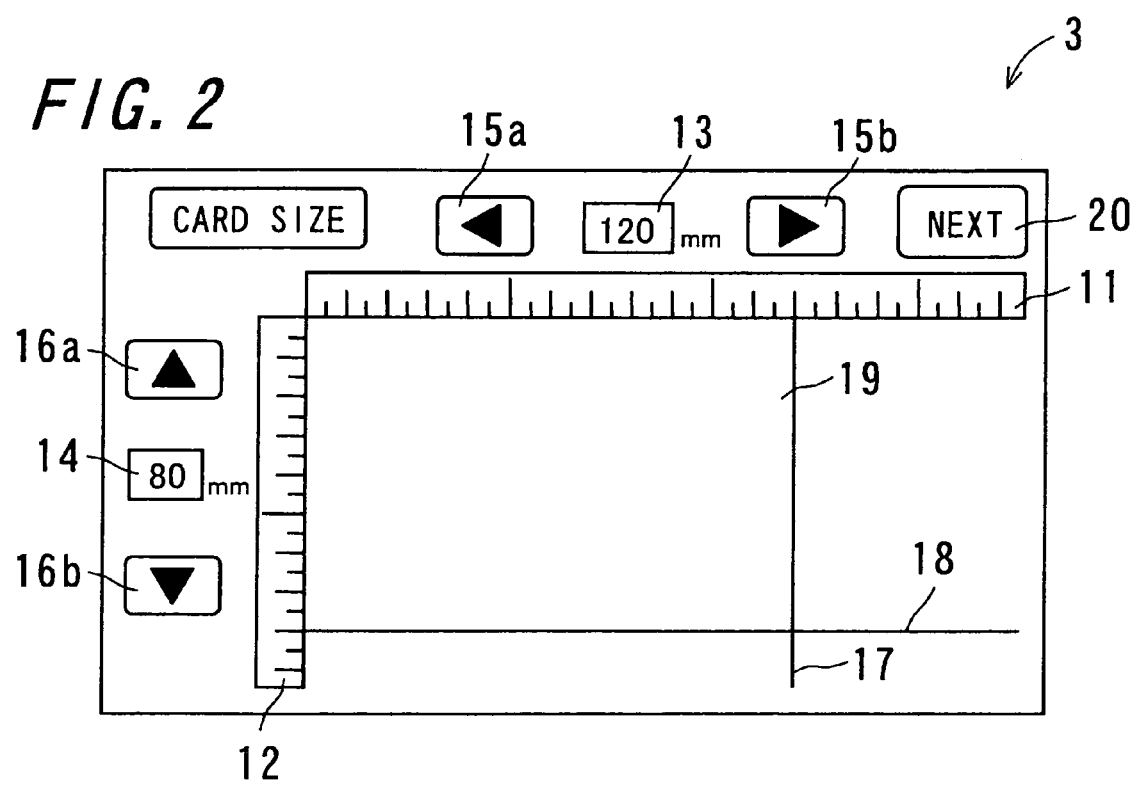
FIG. 2 shows a card size input screen that is displayed on the display unit.

FIG. 2 shows a card size input screen 3 that is displayed on the display unit 103.

In the embodiment, the touch panel that serves as the input unit 102 is overlaid on the display unit 103, and software keys are constructed of the touch panel and keys that are displayed on the display unit 103 as described below. It will be noted that the input unit 102 also includes hardware keys in addition to the touch panel as described above.

On the card size input screen 3 of the display unit 103, a first scale 11 for measuring the size (dimension) of a long side of a card type document and a second scale 12 for measuring the size (dimension) of a short side of a card type document are displayed on the same screen such that they intersect at an origin.

The first scale 11 and the second scale 12 are formed by displaying pseudo-rulers (scales) that are measuring instruments, and scale lines are displayed in directions orthogonal to extension directions of the scales. The scale lines displayed here are main scale lines and auxiliary scale lines that are shorter than the main scale lines, for example, and these scale lines can be displayed in desired step size as a result of a user setting the step size. In the example shown in FIG. 2, the main scale lines have a step size of 1 cm (10 mm) and the auxiliary scale lines have a step size of 5 mm. Moreover, separator scale lines that are longer than the main scale lines can also be displayed every 5 cm and every 10 cm depending on the step sizes that have been set.

Moreover, the unit of step size can be changed to a non-metric, such as the inch, as a result of the user setting the step size. Thus, a situation where the user ends up inputting a size in the wrong unit can be prevented. It will be noted that, in the embodiment, a case where a metric unit is used as the unit of step size will be described.

A long-side size display portion 13 that displays a size that has been inputted as the long side of the card type document is displayed above the first scale 11 in the substantially central portion in the extension direction of the first scale 11, and a short side size display portion 14 that displays a size that has been inputted as the short side of the card type document is displayed to the left of the second scale 12 in the substantially central portion in the extension direction of the second scale 12.

Moreover, on the card size input screen 3, a long-side size-decreasing instruction portion 15*a* and a long-side size-increasing instruction portion 15*b* are displayed in positions that sandwich the long-side size display portion 13 on its left and right sides along the extension direction of the first scale 11, and a short-side size-decreasing instruction portion 16*a* and a short-side size-increasing instruction portion 16*b* are displayed in positions that sandwich the short-side size display portion 14 on its top and bottom sides along the extension direction of the second scale 12.

The long-side size-decreasing instruction portion 15*a* and the long-side size-increasing instruction portion 15*b* construct software keys together with the touch panel, and by pressing down the region of the touch panel that corresponds to the long-side size-decreasing instruction portion 15*a*, the size of the long side of the card type document can be decreased and inputted. By pressing down the region of the touch panel that corresponds to the long-side size-increasing instruction portion 15*b*, the size of the long side of the card type document can be increased and inputted.

Similarly, the short-side size-decreasing instruction portion 16*a* and the short-side size-increasing instruction portion 16*b* construct software keys together with the touch panel, and by pressing down the region of the touch panel that corresponds to the short-side size-decreasing instruction portion 16*a*, the size of the short side of the card type document can be decreased and inputted. By pressing down the region of the touch panel that corresponds to the short-side size-increasing instruction portion 16*b*, the size of the short side of the card type document can be increased and inputted.

The size of the long side and the size of the short side that have been inputted by the instruction portions 15*a*, 15*b*, 16*a* and 16*b* are respectively displayed in the long-side size display portion 13 and in the short-side size display portion 14, and each time the instruction portions 15*a*, 15*b*, 16*a* and 16*b* are pressed down, the size of the long side and the size of the short side that are displayed in the long-side size display portion 13 and in the short-side size display portion 14 also decrease or increase.

A long-side size confirmation line 17 is displayed so as to intersect the extension direction of the first scale 11 and represents the size of the long side that has been inputted, and depending on the size of the long side that is displayed on the long-side size display portion 13, the long-side size confirmation line 17 is displayed so as to cross a coordinate of the first scale 11 that corresponds to the size of the long side that has been inputted.

Further, a short side size confirmation line 18 is displayed so as to intersect the extension direction of the second scale 12, that is, so as to intersect the long-side size confirmation line 17, and represents the size of the short side that has been inputted, and depending on the size of the short side that is displayed on the short-side size display portion 14, the short-side size confirmation line 18 is displayed so as to cross a coordinate of the second scale 12 that corresponds to the size of the short side that has been inputted.

Because the long-side size confirmation line 17 and the short-side size confirmation line 18 are displayed, the user can confirm whether there are input mistakes in the size of the long side and in the size of the short side of the card type document that have been inputted.

Moreover, the region enclosed by the first scale 11, the second scale 12, the long-side size confirmation line 17 and the short-side size confirmation line 18 is displayed as a card size region 19 in a different color such as gray such that it can be distinguished from other regions, and the user can easily confirm, by just looking at the display screen, whether there are input mistakes in the size of the long side and in the size of the short side of the card type document that have been inputted.

A move-to-next-screen instruction portion 20 is displayed on the upper right corner portion of the card size input screen 3 and constructs a software key together with the touch panel, and by pressing down the region of the touch panel that corresponds to the move-to-next-screen instruction portion 20, an instruction to move to the next input screen (in the embodiment, a scale factor input screen 4) is inputted. Further, when the move-to-next-screen instruction portion 20 is pressed down, the size of the long side and the size of the short side of the card type document that have been inputted by the card size input screen 3 are fixed.

Figure 3:
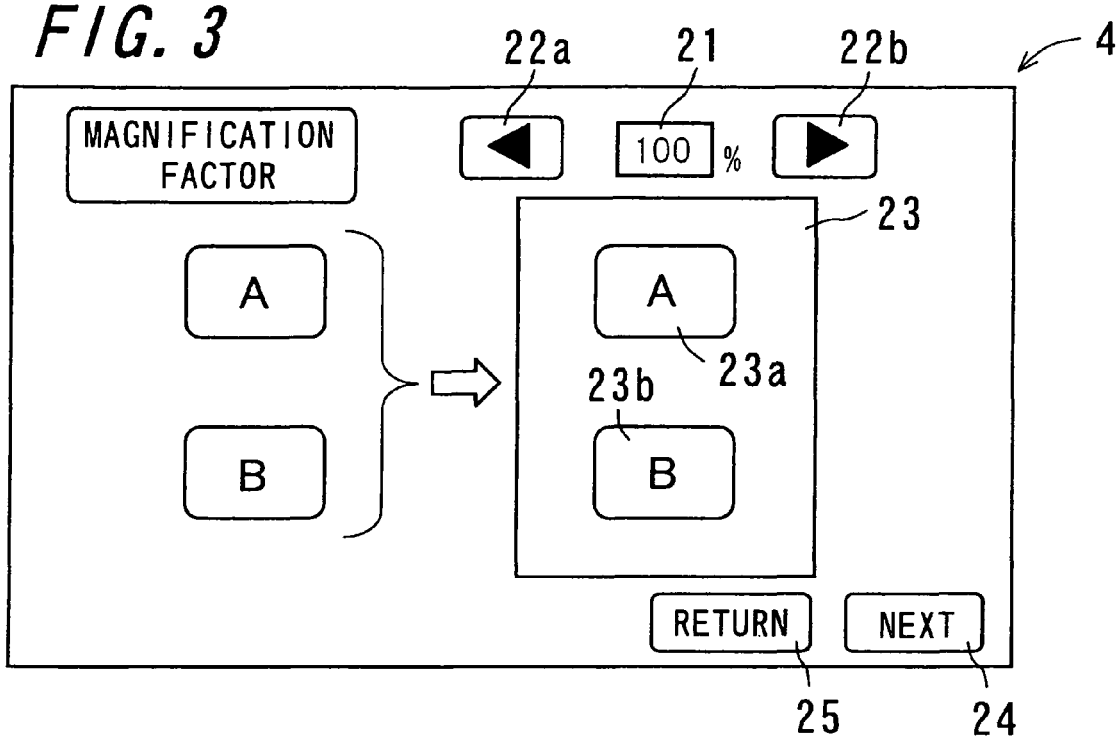
FIG. 3 shows a scale factor input screen that is displayed on the display unit.

FIG. 3 shows a scale factor input screen 4 that is displayed on the display unit 103.

On the scale factor input screen 4, a scale factor display portion 21 that displays the printing scale factor of a copy image of the card type document that has been inputted is displayed, and a scale-factor-decreasing instruction portion 22*a* and a scale-factor-increasing instruction portion 22*b* are displayed in positions that sandwich the scale factor display portion 21 on its left and right sides.

The scale-factor-decreasing instruction portion 22*a* and the scale-factor-increasing instruction portion 22*b* construct software keys together with the touch panel, and by pressing down the region of the touch panel that corresponds to the scale-factor-decreasing instruction portion 22*a*, the scale factor of the copy image can be decreased and inputted. By pressing down the region of the touch panel that corresponds to the scale-factor-increasing instruction portion 22*b*, the scale factor of the copy image can be increased and inputted.

The scale factor that has been inputted by the instruction portions 22*a* and 22*b* is displayed on the scale factor display portion 21, and each time the instruction portions 22*a* and 22*b* are pressed down, the scale factor that is displayed on the scale factor display portion 21 also decreases or increases.

A preview image 23 after scaling is displayed under the scale factor display portion 21. Two images composed of a front side image 23a borne on the front side of the card type document that has been read and a back side image 23b borne on the back side of the card type document that has been read are displayed such that their layout can be confirmed in regard to a copy image, in a case where they have been copied onto the same side of a sheet of paper at the scale factor displayed in the scale factor display portion 21. At this time, the document has not yet been read, so "A" is displayed on the front side image 23a of the card type document that is to be read and "B" is displayed on the back side image 23b of the card type document that is to be read.

Figure 4:
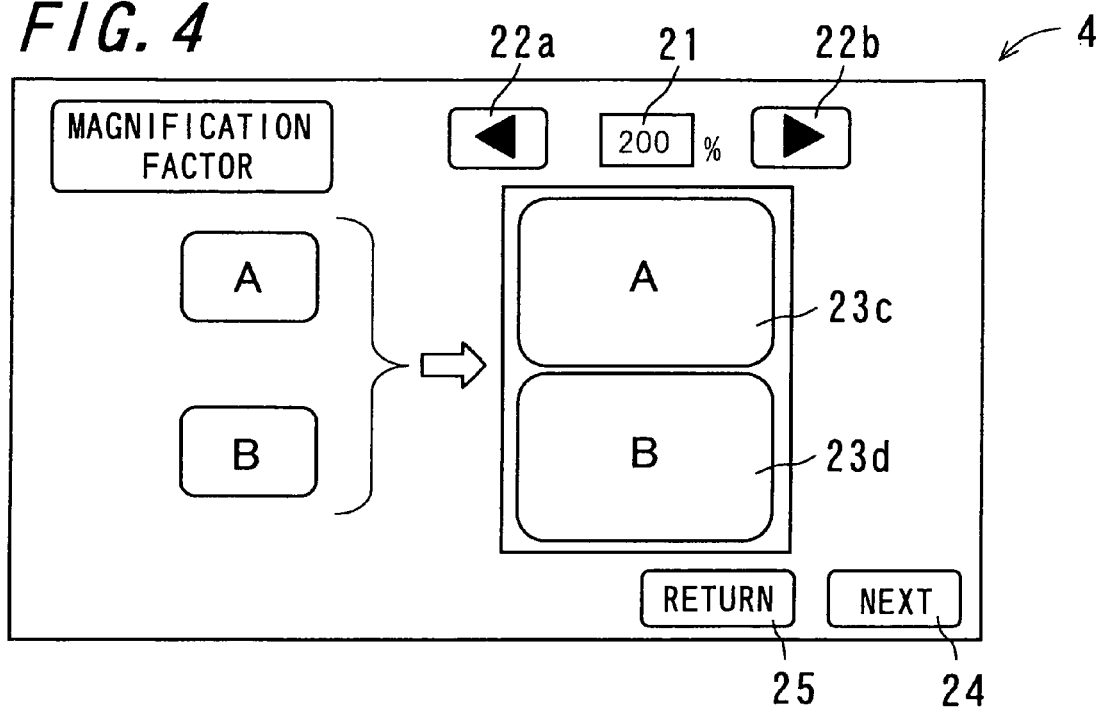
FIG. 4 is a diagram showing the scale factor input screen when a scale factor has been changed.

FIG. 4 is a diagram showing the scale factor input screen 4 when the scale factor has been changed.

The initial value of the scale factor at the point in time when the scale factor input screen 4 is initially displayed is set to 100% (the same scale), and "100%" is displayed on the scale factor display portion 21. Thereafter, when the scale factor is increased to 200%, for example, by pressing down the scale-factor-increasing instruction portion 22b, "200%" is displayed on the scale factor display portion 21, and two images composed of a front side image 23c and a back side image 23d obtained by enlarging the read images of the card type document to 200% are displayed such that their layout can be confirmed in regard to a copy image in a case where they have been copied onto the same side of a sheet of paper.

Further, in a case where the user wishes to reduce the scale factor from the initial value or from the scale factor being currently displayed in the scale factor display portion 21, when the user decreases the scale factor to 70% or the like, by pressing down the scale-factor-decreasing instruction portion 22a, "70%" is displayed on the scale factor display portion 21. Moreover, the preview image 23 is displayed such that the layout of the two images composed of the front side image 23a and the back side image 23b obtained by reducing the read images of the card type document to 70% can be confirmed in regard to a copy image in a case where they have been copied onto the same side of a sheet of paper.

On the lower side of the scale factor input screen 4 and under the preview image 23 after scaling, a move-to-next-screen instruction portion 24 and a move-to-previous-screen instruction portion 25 are displayed and construct software keys together with the touch panel, and by pressing down the region of the touch panel that corresponds to the move-to-next-screen instruction portion 24, an instruction to move to the next input screen (in the embodiment, a rotation angle input screen 5) is inputted. By pressing down the region of the touch panel that corresponds to the move-to-previous-screen instruction portion 25, an instruction to move to the previous input screen (in the embodiment, the card size input screen 3) is inputted.

When the move-to-next-screen instruction portion 24 is pressed down, the scale factor of the copy image of the card type document that has been inputted by the scale factor input screen 4 is fixed.

Figure 5:
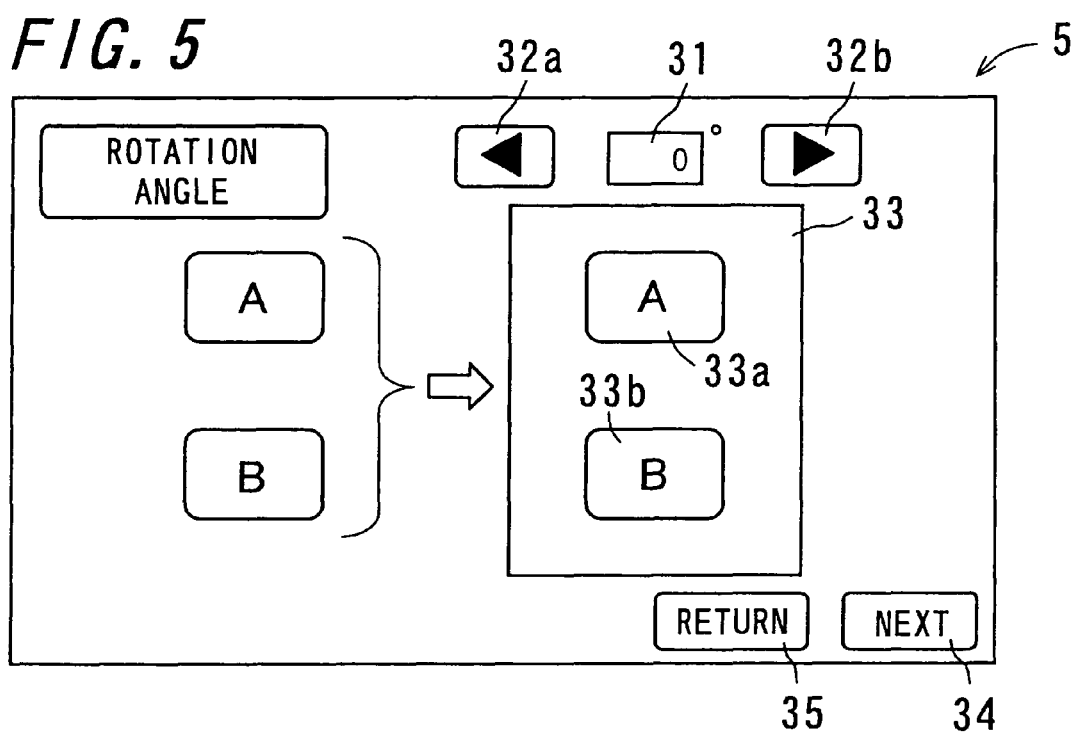
FIG. 5 shows a rotation angle input screen that is displayed on the display unit.

FIG. 5 shows a rotation angle input screen 5 that is displayed on the display unit 103.

On the rotation angle input screen 5, a rotation angle display portion 31 that displays the rotation angle of the copy image of the card type document that has been inputted is displayed, and a rotation-angle-decreasing instruction portion 32a and a rotation-angle-increasing instruction portion 32b are displayed in positions that sandwich the rotation angle display portion 31 on its left and right sides.

The rotation-angle-decreasing instruction portion 32a and the rotation-angle-increasing instruction portion 32b construct software keys together with the touch panel, and by pressing down the region of the touch panel that corresponds to the rotation-angle-decreasing instruction portion 32a, the rotation angle of the copy image can be decreased (in the embodiment, rotated counterclockwise) and inputted. By pressing down the region of the touch panel that corresponds to the rotation-angle-increasing instruction portion 32b, the rotation angle of the copy image can be increased (in the embodiment, rotated clockwise) and inputted.

The rotation angle that has been inputted by the instruction portions 32a and 32b is displayed on the rotation angle display portion 31, and each time the instruction portions 32a and 32b are pressed down, the rotation angle that is displayed on the rotation angle display portion 31 also decreases or increases.

A preview image 33 after rotation is displayed under the rotation angle display portion 31. Two images composed of a front side image 33a borne on the front side of the card type document that has been read and a back side image 33b borne on the back side of the card type document that has been read are displayed such that their layout can be confirmed in regard to a copy image in a case where they have been copied onto the same side of a sheet of paper at the rotation angle displayed in the rotation angle display portion 31. At the current moment, the document has not yet been read, so "A" is displayed on the front side image 33a of the card type document that has been read and "B" is displayed on the back side image 33b of the card type document that has been read.

Figure 6:
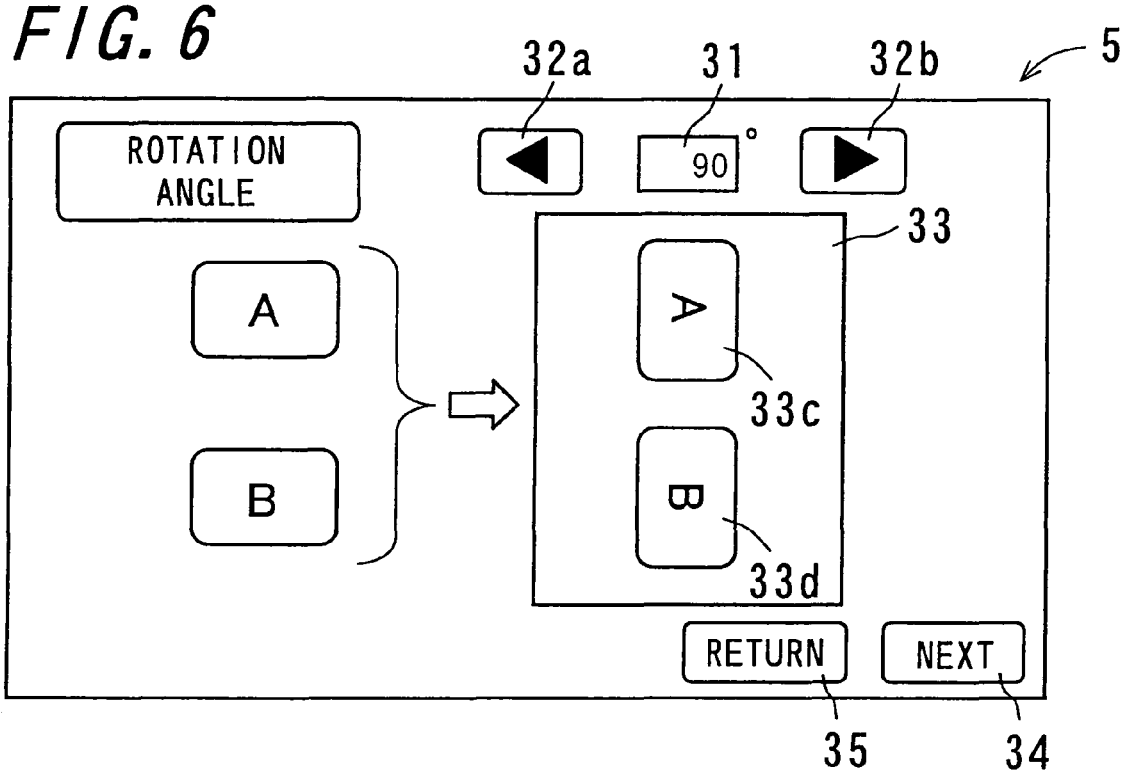
FIG. 6 is a diagram showing the rotation angle input screen when a rotation angle has been changed.

FIG. 6 is a diagram showing the rotation angle input screen 5 when the rotation angle has been changed.

The initial value of the rotation angle, at the time when the rotation angle input screen 5 is initially displayed, is set to 0°, and "0°" is displayed on the rotation angle display portion 31. Thereafter, when the rotation angle is increased to 90° or the like, by pressing down the rotation-angle-increasing instruction portion 32b, "90°" is displayed on the rotation angle display portion 31, and two images composed of a front side image 33c and a back side image 33d obtained by rotating the read images of the card type document by 90° are displayed such that their layout can be confirmed in regard to a copy image in a case where they have been copied onto the same side of a sheet of paper.

Further, in a case where the user wishes to reduce the rotation angle from the initial value or from the rotation angle being currently displayed in the rotation angle display portion 31, and when the user decreases the rotation angle to −90° or the like by pressing down the rotation-angle-decreasing instruction portion 32a, "−90°" is displayed on the rotation angle display portion 31. Moreover, the preview image 33 is displayed such that the layout of the two images composed of the front side image 33a and the back side image 33b obtained by rotating the read images of the card type document 90° to the left can be confirmed in regard to a copy image in a case where they have been copied onto the same side of a sheet of paper.

In the embodiment, a rotation angle of 0° is an angle when the card type document images that have been read are not rotated and retain the same orientation as when they were read. When the rotation angle is thereafter increased, the copy image is rotated clockwise by the angle that has been inputted, and when the rotation angle is thereafter decreased, the copy image is rotated counterclockwise by the angle that has been inputted. Rotation of the copy image is done by rotating each read image without the positional relationship between the front side image 33a and the back side image 33b being changed. That is, rather than there being one center of rotation in the middle of the two images, a center of rotation is respectively set in the two images.

On the lower side of the rotation angle input screen 5 and under the preview image 33 after rotation, a move-to-next-screen instruction portion 34 and a move-to-previous-screen instruction portion 35 are displayed and construct software keys together with the touch panel, and by pressing down the region of the touch panel that corresponds to the move-to-next-screen instruction portion 34, an instruction to move to the next screen (in the embodiment, a front-side image reading instruction screen 6) is inputted. By pressing down the region of the touch panel that corresponds to the move-to-previous-screen instruction portion 35, an instruction to move to the previous input screen (in the embodiment, the scale factor input screen 4) is inputted.

When the move-to-next-screen instruction portion 34 is pressed down, the rotation angle of the copy image of the card type document that has been inputted by the rotation angle input screen 5 is fixed.

Figure 7:
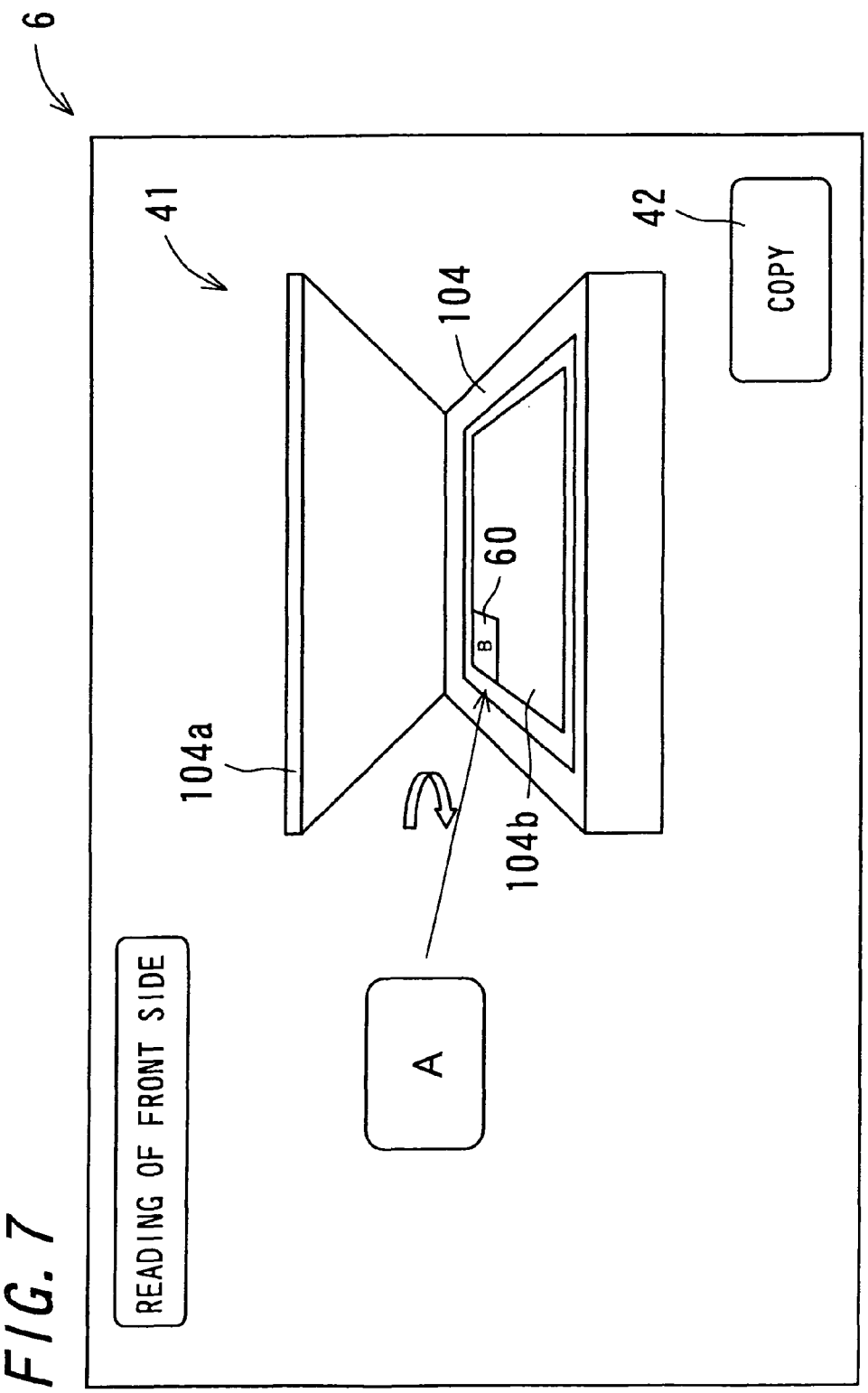
FIG. 7 shows a front-side image reading instruction screen that is displayed on the display unit.

FIG. 7 shows a front-side image reading instruction screen 6 that is displayed on the display unit 103.

On the front-side image reading instruction screen 6, a schematic diagram is displayed and a guidance to teach the user is provided mainly in regard to the placement position and the placement surface of a card type document on the image reading unit 104.

On the front-side image reading instruction screen 6, a perspective diagram 41 is displayed where a cover portion 104*a* of the image reading unit 104 is opened such that a reading platen 104*b* can be seen, and the position where the card type document 60 is to be placed on the reading platen 104*b* is displayed. Moreover, because it is necessary to place the front side of the card type document face down in order to read the front side of the card type document, "B" representing the back side is displayed on the perspective diagram 41 so that the user will turn the back side of the card type document 60 upward.

In the lower right corner portion of the front-side image reading instruction screen 6, a front-side copy instruction portion 42 is displayed and constructs a software key together with the touch panel, and by pressing down the region of the touch panel that corresponds to the front-side copy instruction portion 42 in a state where the card type document 60 has actually been placed on the reading platen 104*b*, an instruction to read a document image is outputted to the image reading unit 104 and an instruction to move to the next screen (in the embodiment, a back-side image reading instruction screen 7) is inputted.

Figure 8:
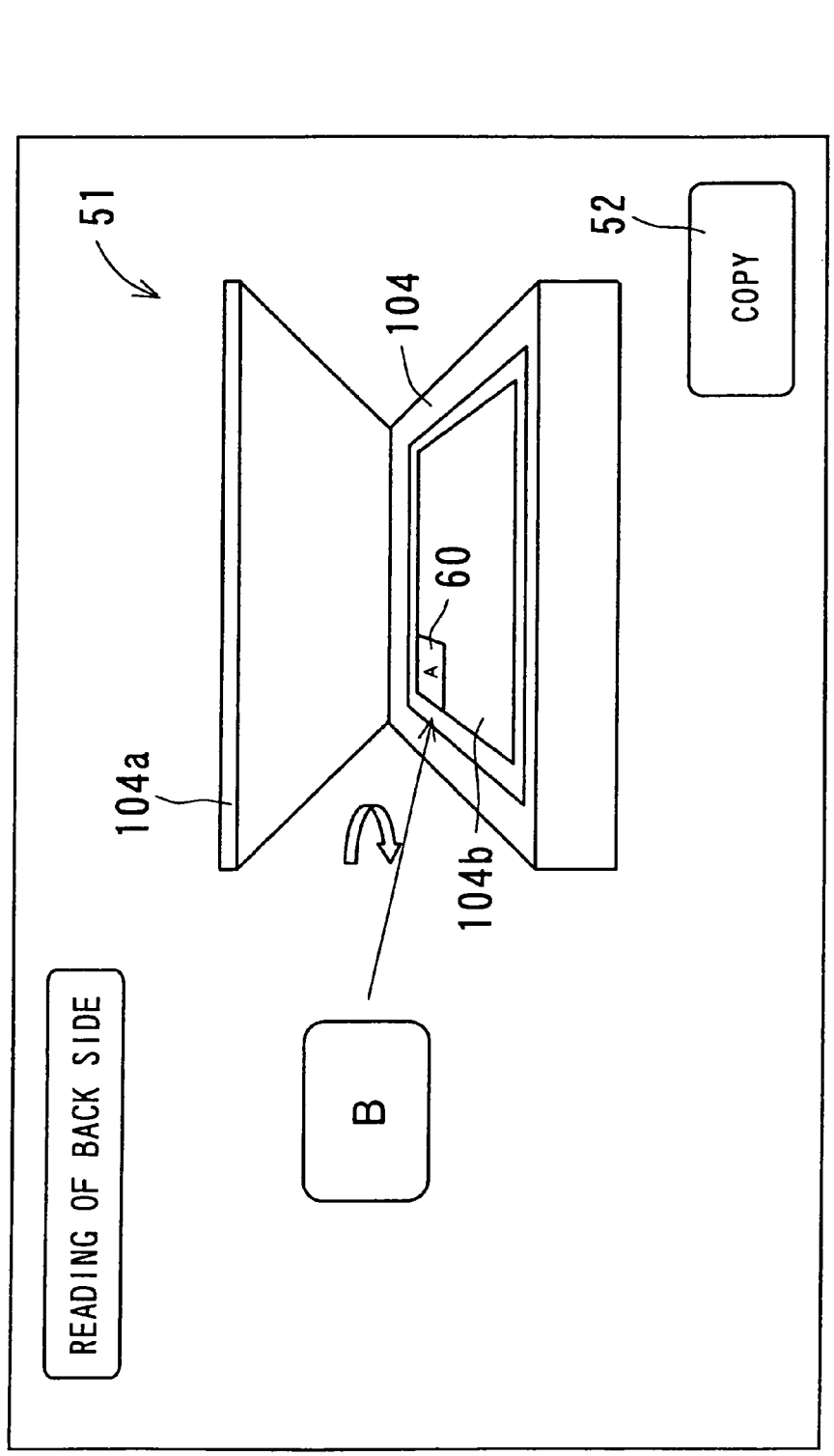
FIG. 8 shows a back-side image reading instruction screen that is displayed on the display unit.

FIG. 8 shows a back-side image reading instruction screen 7 that is displayed on the display unit 103.

On the back-side image reading instruction screen 7, similar to the front-side image reading instruction screen 6, a schematic diagram is displayed and guidance to teach the user is performed mainly in regard to the placement position and the placement surface of the card type document on the image reading unit 104.

In the back-side image reading instruction screen 7, a perspective diagram 51 is displayed where the cover portion 104*a* of the image reading unit 104 is opened such that the reading platen 104*b* can be seen, and the position where the card type document 60 is to be placed on the reading platen 104*b* is displayed. Moreover, because it is necessary to turn the back side of the card type document 60 downward in order to read the back side of the card type document 60, an "A" representing the front side is displayed on the perspective diagram 51 so that the user will turn the front side of the card type document 60 upward.

In the lower right corner portion of the back-side image reading instruction screen 7, a back-side copy instruction portion 52 is displayed and constructs a software key together with the touch panel, and by pressing down the region of the touch panel that corresponds to the back-side copy instruction portion 52 in a state where the card type document 60 has actually been placed on the reading platen 104*b*, an instruction to read a document image is outputted to the image reading unit 104.

As described above, the size of the card type document can be measured by the first scale 11 and the second scale 12 displayed on the screen and can be confirmed and inputted, so a situation where the user mistakenly inputs the (vertical and horizontal) dimensions of the long side and the short side can be prevented, and a situation where part of an image goes missing in the copy image can be prevented.

Figure 9:
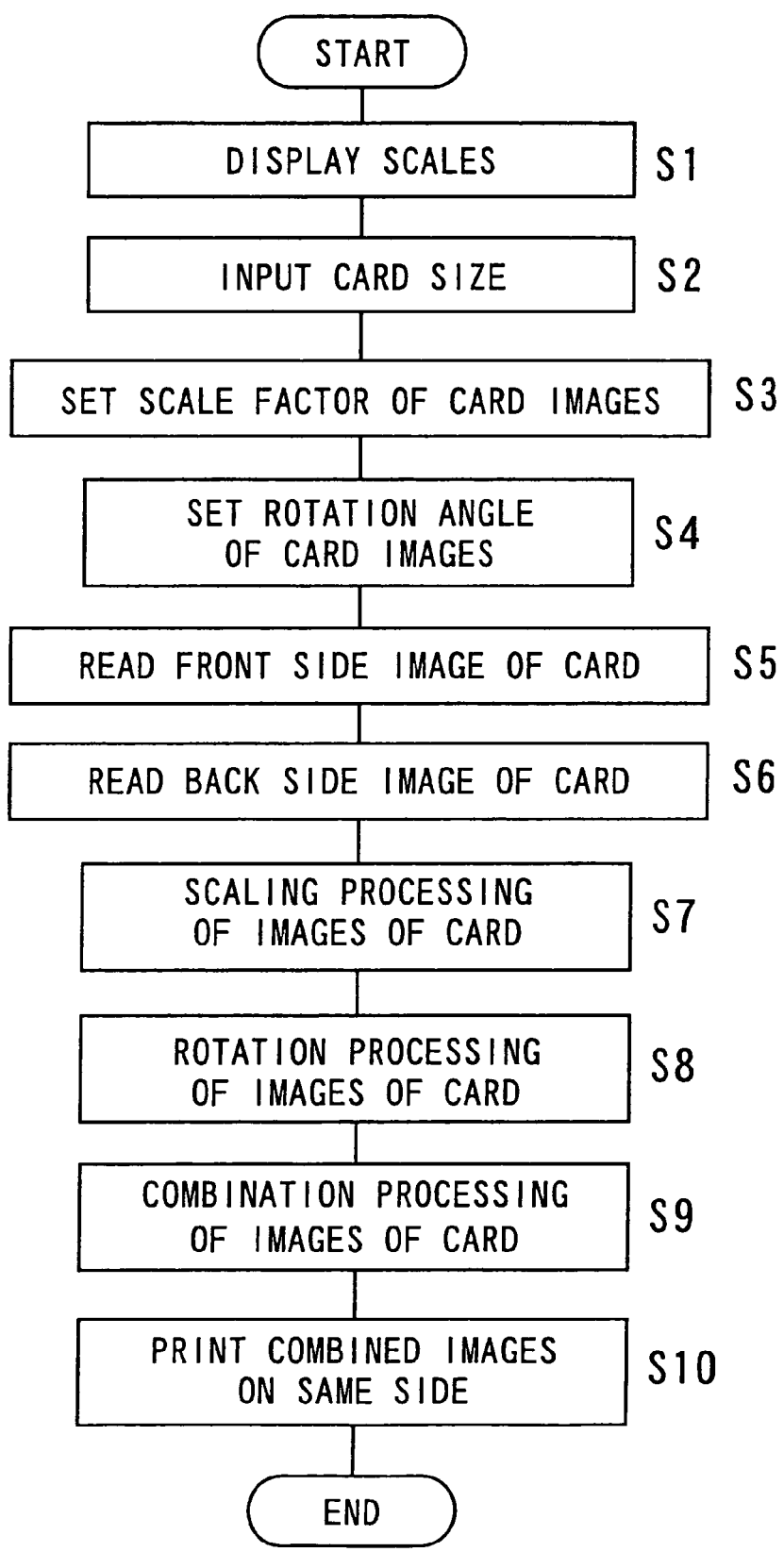
FIG. 9 is a flowchart showing card-type document copy processing by the image forming apparatus.

FIG. 9 is a flowchart showing card type document copy processing by the image forming apparatus 1.

First, in step S1, the first scale 11 and the second scale 12 for measuring the size of the card type document are displayed on the display unit 103.

In step S2, the long-side size-decreasing instruction portion 15*a*, the long-side size-increasing instruction portion 15*b*, the short-side size-decreasing instruction portion 16*a* and the short-side size-increasing instruction portion 16*b* are operated, and the size of the long side and the size of the short side of the card type document are inputted. At this time, the long side size confirmation line 17 and the short side size confirmation line 18 are displayed in accordance with the sizes that have been inputted. Moreover, the card size region 19 enclosed by the first scale 11, the second scale 12, the long side size confirmation line 17 and the short side size confirmation line 18 is displayed. When the move-to-next-screen instruction portion 20 is pressed down, the size of the long side and the size of the short side that have been inputted are fixed, and the procedure proceeds to step S3.

In step S3, the scale factor input screen 4 is displayed, the scale-factor-decreasing instruction portion 22*a* and the scale-factor-increasing instruction portion 22*b* are operated, and the scale factor is inputted. A preview image corresponding to the scale factor that has been inputted is displayed. When the move-to-next-screen instruction portion 24 is pressed down, the scale factor that has been inputted is fixed, and the procedure proceeds to step S4.

In step S4, the rotation angle input screen 5 is displayed, the rotation-angle-decreasing instruction portion 32*a* and the rotation-angle-increasing instruction portion 32*b* are operated, and the rotation angle is inputted. A preview image corresponding to the rotation angle that has been inputted is displayed. When the move-to-next-screen instruction portion 34 is pressed down, the rotation angle that has been inputted is fixed, and the procedure proceeds to step S5.

In step S5, the front-side image reading instruction screen 6 is displayed, and when the front-side copy instruction portion 42 is operated, an instruction to read a document image is outputted to the image reading unit 104, an image of the front side of the card type document is read, and the front side image that has been read is associated with an address and stored in the buffer memory unit 106.

In step S6, the back-side image reading instruction screen 7 is displayed, and when the back-side copy instruction portion 52 is operated, an instruction to read a document image is outputted to the image reading unit 104, an image of the back side of the card type document is read, and the back side image that has been read is associated with an address and stored in the buffer memory unit 106.

In step S7, scaling processing is performed, based on the scale factor that was inputted in step S3, with respect to the front side image and the back side image of the card type document that have been stored in the buffer memory unit 106.

In step S8, rotation processing is performed, on the basis of the rotation angle that was inputted in step S4, with respect to the front side image and the back side image of the card type document that have been stored in the buffer memory unit 106.

In step S9, the front side image and the back side image that have been scaled and rotated based on the scale factor and the rotation angle that have been inputted are combined.

In step S10, the images that have been combined are formed on one side of a sheet of printing paper.

Creation of the images that have been combined is performed as follows, for example.

The two images are arranged, on the basis of the size of the long side and the size of the short side that were inputted in step S2, such that, with respect to a sheet of printing paper that has been equally divided into a top half and a bottom half to form an upper rectangle and a bottom rectangle, the center of the front side image coincides with the center of the upper rectangle and the center of the back side image coincides with the center of the lower rectangle, and these are combined to create one image.

Figure 10A:
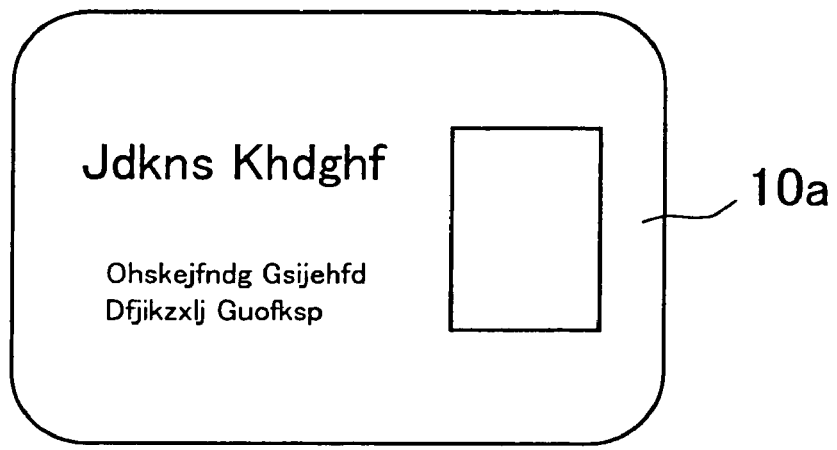
FIGS. 10A and 10B are diagrams showing images of the card-type document that have been read and obtained by the image reading unit.
Figure 10B:
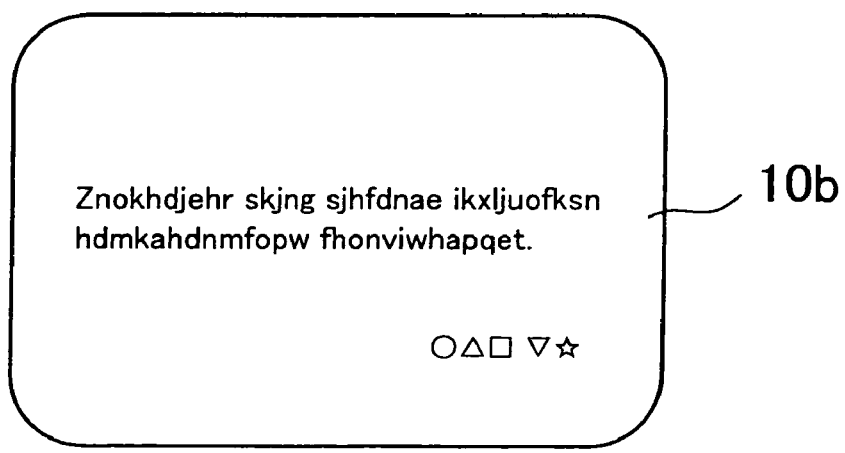

FIGS. 10A and 10B are diagrams showing images 10 of the card type document that have been read and obtained by the image reading unit 104. FIG. 10A shows a front side image 10a, and FIG. 10B shows a back side image 10b.

These read images 10 are obtained by placing the card type document 60 in a predetermined position on the image reading unit 104 (in the embodiment, the upper left corner of the reading platen 104b) and reading the card type document 60, and alphabetical letters and a quadrilateral image are included in the read images 10.

Figure 11:
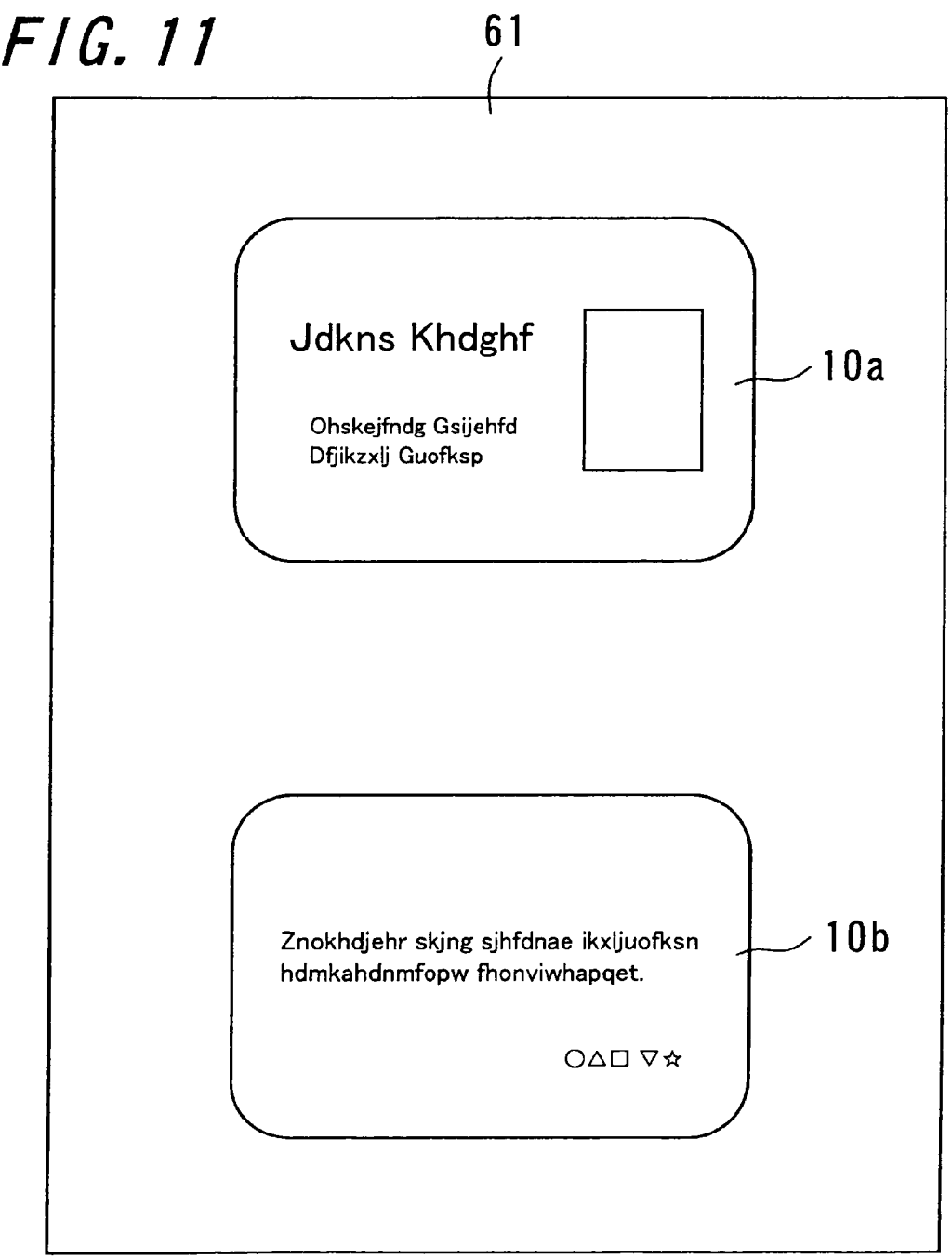
FIG. 11 is a diagram showing an example of a copy image.
Figure 12:
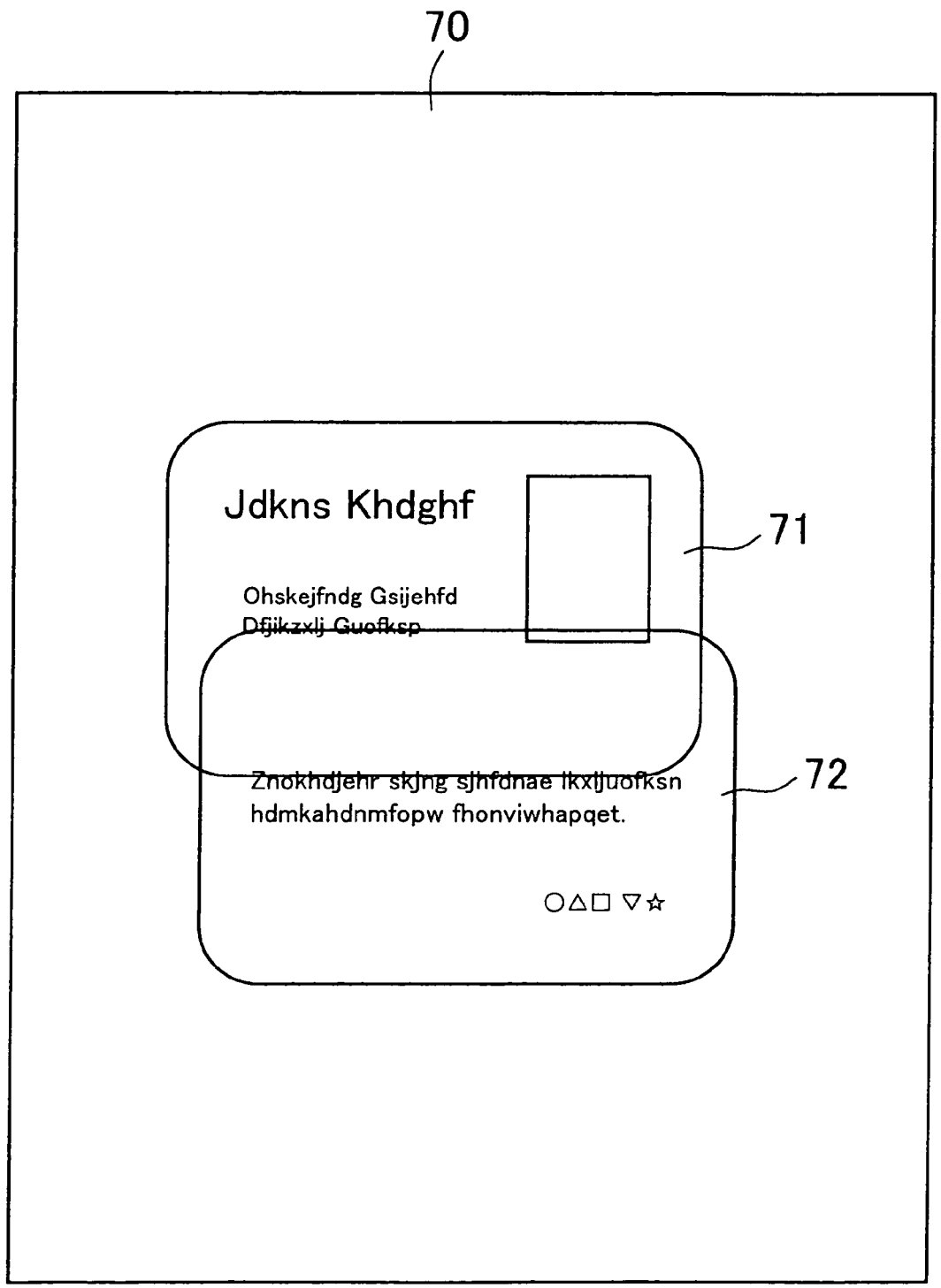
FIG. 12 is a diagram showing a failed copy image.
Figure 14:
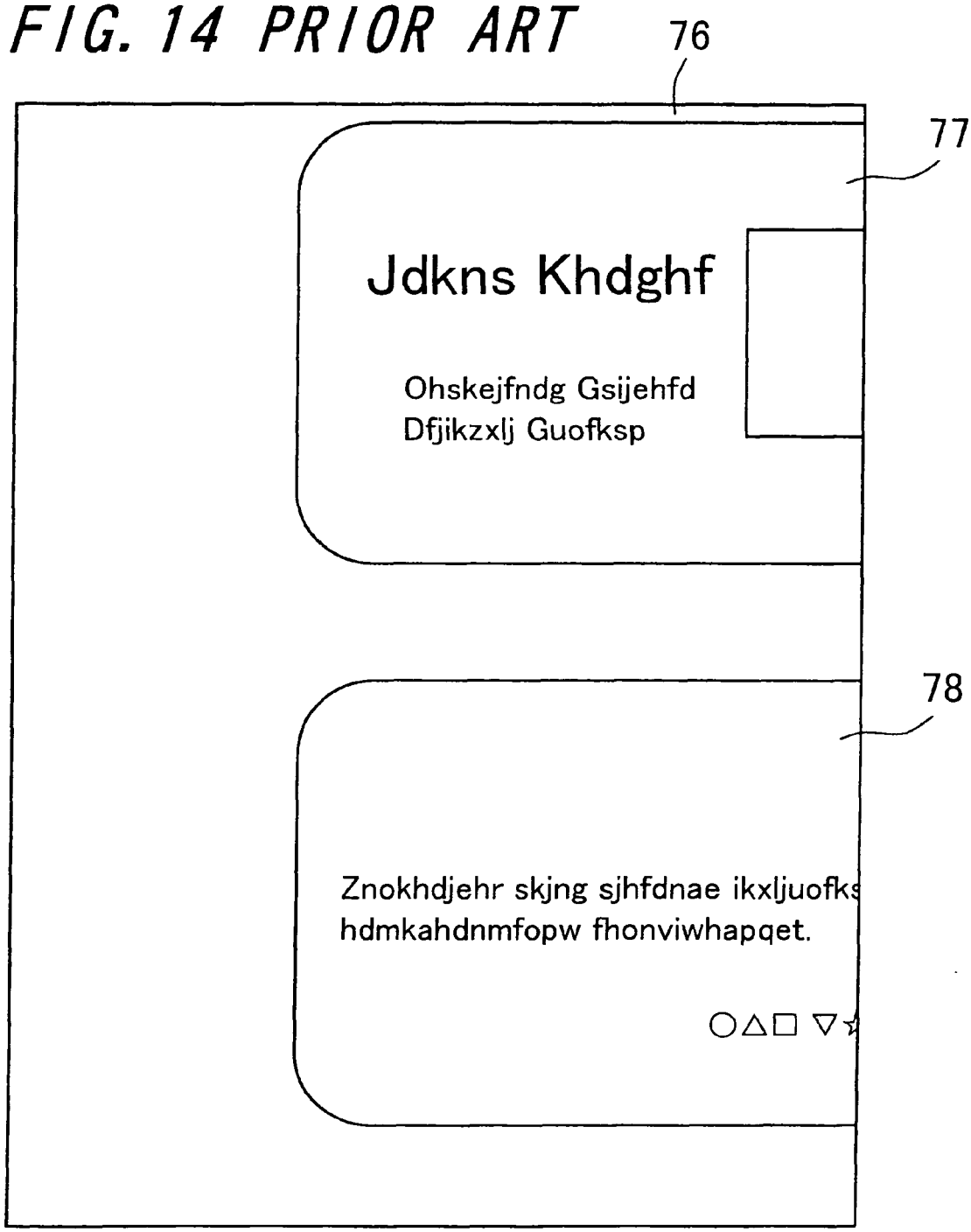
FIG. 14 is a diagram showing a failed copy image.

FIG. 11 is a diagram showing an example of a copy image 61.

The copy image 61 is an image where, as shown in FIGS. 10A and 10B, the front side image 10a and the back side image 10b of the read images 10 of the card type document have been copied onto the same side of a sheet of paper. In this example, the scale factor and the rotation angle have been set to a scale factor of 100% (the same scale) and a rotation angle of 0° (no rotation).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image forming apparatus that reads images of both a front side and a back side of a card type document and prints the two document images that the image forming apparatus has read onto a same side of a recording medium, the image forming apparatus comprising:
   a measurement instrument display unit that displays a measurement instrument that measures the dimensions of the card type document;
   a dimension input unit that inputs the dimensions of the card type document based on the dimensions measured by the measurement instrument; and
   a setting unit that sets arrangement positions of the two document images on the same side of the recording medium based on the dimensions that have been inputted by the dimension input unit.

2. The image forming apparatus of claim 1, wherein the measurement instrument display unit displays a first measurement instrument that measures the dimension of a long side of the card type document and a second measurement instrument that measures the dimension of a short side of the card type document, and
   the dimension input unit includes a first dimension input unit that inputs the dimension of the long side of the card type document and a second dimension input unit that inputs the dimension of the short side of the card type document.

3. The image forming apparatus of claim 2, wherein the measurement instrument display unit displays the first measurement instrument and the second measurement instrument on the same screen such that an extension direction of the first measurement instrument and an extension direction of the second measurement instrument intersect.

4. The image forming apparatus of claim 3, wherein the measurement instrument display unit displays, in accordance with the dimensions that have been inputted by the dimension input unit, dimension confirmation lines that intersect the extension directions of the measurement instruments at those places of the measurement instruments.

5. The image forming apparatus of claim 1, wherein the measurement instrument display unit switches between metric units and non-metric units and displays a display unit of the measurement instrument, accordingly.

6. The image forming apparatus of claim 1, further comprising a scale factor input unit that inputs a scale factor when printing the document images that the image forming apparatus has read,
   wherein the setting unit sets arrangement positions of the two document images on the same side of the recording medium based on the dimensions that have been inputted by the dimension input unit and the scale factor that has been inputted by the scale factor input unit.

7. The image forming apparatus of claim 1, further comprising a rotation angle input unit that inputs a rotation angle when printing the document images that the image forming apparatus has read,
   wherein the setting unit sets arrangement positions of the two document images on the same side of the recording medium based on the dimensions that have been inputted by the dimension input unit and the rotation angle that has been inputted by the rotation angle input unit.

8. An image forming method that reads images of both a front side and a back side of a card type document and prints the two document images that the image forming method has read onto a same side of a recording medium, the image forming method comprising the steps of:
   displaying a measurement instrument that measures the dimensions of the card type document;
   inputting the dimensions of the card type document based on the dimensions measured by the measurement instrument; and
   setting arrangement positions of the two document images on the same side of the recording medium based on the dimensions that have been inputted.

* * * * *